United States Patent Office 3,634,415
Patented Jan. 11, 1972

3,634,415
4-ALKYLIDENE AND 4-ARYLIDENE-5,6,7,8-TETRA-HYDRO-1,3(2H,4H)-ISOQUINOLINEDIONES
Harold Zinnes, Rockaway, John Shavel, Jr., Mendham, Neil A. Lindo, Chatham, and Gene di Pasquale, Morris Plains, N.J., assignors to Warner-Lambert Company, Morris Plains, N.J.
No Drawing. Filed Apr. 25, 1969, Ser. No. 819,467
Int. Cl. C07d 35/06
U.S. Cl. 260—240 F          13 Claims

ABSTRACT OF THE DISCLOSURE

The present invention describes a new class of 4-alkylidene and 4-arylidene-5,6,7,8-tetrahydro-1,3(2H,4H)-isoquinolinediones having the formula:

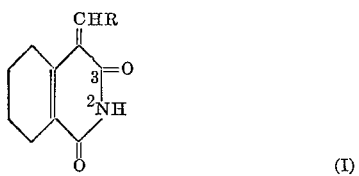

(I)

wherein R is alkyl or an unsubstituted or substituted aryl group.

These compounds are useful as anti-inflammatory agents.

---

The present invention relates to isoquinolines; and more particularly, the present invention relates to 4-alkylidene and 4-arylidene-5,6,7,8-tetrahydro-1,3-(2H,4H)-isoquinolinediones having the formula:

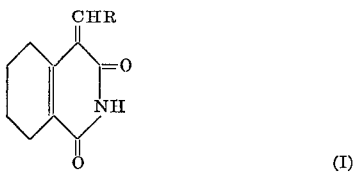

(I)

wherein R is alkyl or an unsubstituted or substituted aryl.

The term "unsubstituted aryl" as used throughout this disclosure denotes a homocyclic or heterocyclic aromatic hydrocarbon radical preferably of 6 to 10 carbon atoms such as for example phenyl, tolyl or containing a heterocyclic such as pyridyl, furfuryl, pyrryl, thienyl, indolyl, and the like. The term "substituted aryl" as used in this application comprehends those aryl groups as defined in which one or more of the hydrogen atoms of the aromatic nucleus have been substituted by a group such as phenyl, halogen, hydroxyl, trifluoromethyl, nitro, lower alkyl, lower alkoxy, acetamido, cycloalkyl, in which cycloalkyl encompasses saturated monocyclic groups having from 3 to 8 carbon atoms, such as cyclopropyl, cyclobutyl, cyclopentyl, cyclohexyl, cycloheptyl and cyclooctyl, or a 5 or 6 membered heterocyclic having at least one hetero atom in the ring which may be either nitrogen, oxygen or sulfur, for example, pyrridyl, thienyl, furyl, pyrryl and the like. The term "alkyl" contains up to 7 carbon atoms such as methyl, ethyl, propyl, isopropyl and the like.

All the compounds of this invention are capable of decreasing the formation of granuloma tissue in a mammalian host, such as rats, guinea pigs. For example, when they are administered locally at an inflamed site which has been induced by the implantation of a cotton pellet, they are capable of suppressing at 25 to 100 mg./kg. The procedure of this test is described in Meier, R.; W. Schuler and P. Desaulles, Experientia, vol. 6, p. 469, 1950. These compounds further exhibit the ability to uncouple oxidative phosphorylation, a property known to anti-inflammatory agents such as indomethacin, phenylbutazone and so on. In addition, these compounds are cytostatic in that they inhibit the growth curve of protozoans such as *Tetrahymena pyriformis* compounds such as methotrexate, which are useful in the treatment of psoriasis, also exhibit this property. Accordingly, they can also be applied topically to treat dandruff or psoriasis.

To use these compounds as anti-inflammatory agents, they are generally blended with a dermotologically acceptable vehicle such as vaseline, talc, with the active ingredient being present from about 1 to 5% by weight. They are applied liberally to an inflamed site 2 or 3 times daily.

To use these compounds to treat dandruff, they are incorporated in a dermatologically acceptable vehicle or in a shampoo base with the active ingredient being present from about 1 to 5% by weight; they are applied locally 2 to 3 times a day.

According to the present invention, the above compounds are prepared by three methods.

The preferred Method A comprises condensing a compound of the formula:

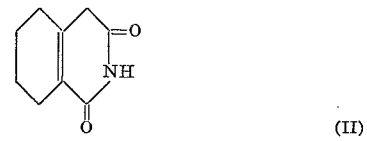

(II)

with an aldehyde of the formula R—CHO, in which R is as defined, in a lower molecular weight alcohol such as mtehanol or ethanol in the presence of a base, such as sodium methoxide. The temperature employed in this process is that at the refluxing temperature of the solvent. The starting material II is prepared according to the disclosure by Grewe et al., Chem. Ber., 81, 279 (1948).

Method B comprises heating the compound of Structure II with an aldehyde R—CHO and ammonium acetate in a solvent consisting of a mixture of toluene and pyridine, for example, at a ratio of 2:1 under reflux conditions and under the condition of water removal, for example, by employing a Dean-Starke tube to remove the water formed from the reaction.

Finally, Method C involves heating II at about 90° C. using the lower alkanoic acid, such as formic or acetic as the solvent.

In all the methods, A, B and C, the reaction product obtained is recovered from the reaction mixture by methods known to the art, as illustrated in the examples that follow. All temperatures are given in degrees centigrade.

EXAMPLE 1

4-arylidene-5,6,7,8-tetrahydro-1,3-(2H,4H)-isoquinolinediones

Method A—General procedure

To a refluxing solution of 0.05 mole of 5,6,7,8-tetrahydrohomophthalimide and 0.05 mole of aldehyde was added 0.3 g. of sodium methoxide. When the aldehyde used contained a carboxy group (i.e. p-carboxybenzaldehyde), a total of 3 g. of sodium methoxide was used. The solution was refluxed for 1–3 hours and worked up as described for the individual compounds.

EXAMPLE 2

4-benzylidene-5,6,7,8-tetrahydro-1,3(2H,4H)-isoquinolinedione

Using benzaldehyde, the reaction mixture was refluxed for 1 hour, concentrated to half its volume, and stirred at room temperature for 20 hours. The resulting yellow precipitate was collected and washed with cold methanol to give 9.7 g. of material, M.P. 149–157°. Recrystallization from methanol gave 12.4 g. of product, M.P. 160–179°.

*Analysis.*—Calcd. for $C_{16}H_{15}NO_2$ (percent): C, 75.87; H, 5.97; N, 5.53. Found (percent): C, 75.89; H, 5.94; N, 5.53.

EXAMPLE 3

4-(p-fluorobenzylidene)-5,6,7,8-tetrahydro-1,3(2H,4H)-isoquinolinedione

Using p-fluorobenzaldehyde, the reaction mixture was refluxed for 2 hours and concentrated to a volume of 150 ml. It was cooled and made acidic with acetic acid. The resulting gummy precipitate was dissolved in warm acetic acid and water was carefully added to give 5 g. of a yellow crystalline precipitate. The filtrate was extracted with dichloromethane, and the organic layer was washed with several portions of 1 N sodium hydroxide. Evaporation gave 2 g. of additional product. The combined material had M.P. 155–167°. Recrystallization from isopropyl ether gave 4.5 g. of material, M.P. 159–165°.

*Analysis.*—Calcd. for $C_{16}H_{14}FNO_2$ (percent): C, 70.84; H, 5.20; N, 5.16; F, 7.00. Found (percent): C, 71.12; H, 5.24; N, 5.06; F, 6.90.

EXAMPLE 4

4-(2,4-dichlorobenzylidene)-5,6,7,8-tetrahydro-1,3(2H,4H)-isoquinolinedione

Using 2,4-dichlorobenzaldehyde, the reaction mixture was refluxed for 2 hours. It was concentrated to a volume of 250 ml. and cooled on an ice bath to give 13.9 g. of a yellow precipitate. Recrystallization from glacial acetic acid gave 11 g. of product, M.P. 209–211° dec.

*Analysis.*—Calcd. for $C_{10}H_{13}Cl_2NO_2$ (percent): C, 59.65; H, 4.07; Cl, 22.01; N, 4.35. Found (percent): C, 59.52; H, 4.09; N, 4.34; Cl, 22.12.

EXAMPLE 5

4-(p-carboxybenzylidene)-5,6,7,8-tetrahydro-1,3(2H,4H)-isoquinolinedione

Using p-carboxybenzaldehyde, the reaction mixture was refluxed for 2 hours and allowed to stand at room temperature for 20 hours. It was acidified by the addition of 5 ml. of concentrated hydrochloric acid while stirring vigorously. The resulting precipitate was recrystallized from glacial acetic acid to give 6 g. of product, M.P. 270–298° dec.

*Analysis.*—Calcd. for $C_{17}H_{15}NO_4$ (percent): C, 68.67; H, 5.08; N, 4.71. Found (percent): C, 68.41; H, 5.16; N, 4.55.

EXAMPLE 6

4-(o-carboxybenzylidene)-5,6,7,8-tetrahydro-1,3(2H,4H)-isoquinolinedione

Using o-carboxybenzaldehyde, the reaction mixture was refluxed for 3 hours and allowed to stand at room temperature for 3 days. It was concentrated to half of its original volume, pourer into excess water, and acidified with hydrochloric acid. The resulting precipitate was partitioned between 10% aqueous sodium bicarbonate solution and dichloromethane. Reacidification of the alkaline layer gave a precipitate which was recrystallized from methanol to give 6 g. of product, M.P. 246–263°.

*Analysis.*—Calcd. for $C_{17}H_{15}NO_4$ (percent): C, 68.67; H, 5.08; N, 4.71. Found (percent): C, 68.74; H, 4.98; N, 4.46.

EXAMPLE 7

4-(p-hydroxybenzylidene)-5,6,7,8-tetrahydro-1,3(2H,4H)-isoquinolinedione

Using p-hydroxybenzaldehyde, the reaction mixture was refluxed for 3 hours and concentrated to a volume of 100 ml. and refrigerated for 3 days to give 10.0 g. of orange precipitate. Recrystallization from methanol gave 7.5 g. of product, M.P. 180–208°.

*Analysis.*—Calcd. for $C_{16}H_{15}NO_3$ (percent): C, 71.36; H, 5.61; N, 5.20. Found (percent): C, 71.33; H, 5.65; N, 5.23.

EXAMPLE 8

4-(p-cyclohexylbenzylidene)-5,6,7,8-tetrahydro-1,3(2H,4H)-isoquinolinedione

Using p-cyclohexylbenzaldehyde, the reaction mixture was refluxed for 2 hours. Concentration and cooling gave a precipitate which was collected and recrystallized from aqueous acetic acid and then from ethyl acetate to give 7.7 g. of product, M.P. 173–184°.

*Analysis.*—Calcd. for $C_{22}H_{25}NO_2$ (percent): C, 78.77; H, 7.51; N, 4.18. Found (percent): C, 78.79; H, 7.45; N, 4.15.

EXAMPLE 9

4-(p-pentylbenzylidene)-5,6,7,8-tetrahydro-1,3(2H,4H)-isoquinolinedione

Using p-pentylbenzaldehyde, the reaction mixture was refluxed for 2 hours and concentrated to a volume of 150 ml. It was poured into a large excess of dilute acetic acid and extracted with ether. The ether solution was washed with aqueous sodium carbonate and concentrated to a syrup which crystallized (12 g.) on standing. This was taken up in 600 ml. of hot Skellysolve B and the solution was charcoaled, filtered, and cooled slowly with stirring (to prevent oiling) to give 5 g. of product, M.P. 90–98°.

*Analysis.*—Calcd. for $C_{21}H_{25}NO_2$ (percent): C, 77.98; H, 7.79; N, 4.33. Found (percent): C, 78.28; H, 7.86; N, 4.42.

EXAMPLE 10

4-(p-chlorobenzylidene)-5,6,7,8-tetrahydro-1,3(2H,4H)-isoquinolinedione

Using p-chlorobenzaldehyde, the reaction mixture was refluxed for 1 hour, cooled to room temperature, and filtered to remove a grey high melting solid. Concentration of the filtrate to a small volume gave 8.7 g. of a dark yellow green precipitate. This was extracted with several portions of hot benzene. Concentration of the filtered benzene solution gave 8.2 g. of yellow crystalline product, M.P. 168–181°. The M.P. was unchanged by recrystallization from benzene.

*Analysis.*—Calcd. for $C_{16}H_{14}ClNO_2$ (percent): C, 66.79; H, 4.90; N, 4.87; Cl, 12.32. Found (percent): C, 66.91; H, 5.01; N, 4.92; Cl, 12.42.

EXAMPLE 11

4-(2-methylpentylidene)-5,6,7,8-tetrahydro-1,3(2H,4H)-isoquinolinedione

Using 2-methylvaleraldehyde, the reaction mixture was refluxed for 3 hours and the solvent was evaporated. The dark residue was dissolved in dichloromethane and the solution was washed successively with 0.1 N sodium hydroxide and saturated sodium chloride solution. Evaporation of the organic layer gave a residue which was dissolved in 200 ml. of isopropyl ether. The solution was allowed to stand at room temperature and filtered to remove colored impurities which had settled. Concentration of the filtrate gave 4.5 g. of yellow crystals, M.P. 113–116°. Recrystallization from isopropyl ether gave material, M.P. 114–116.5°.

*Analysis.*—Calcd. for $C_{15}H_1NO_2$ (percent): C, 72.84; H, 8.56; N, 5.60. Found (percent): C, 72.93; H, 8.55; N, 5.80.

EXAMPLE 12

4-(4-pyridylmethylene)-5,6,7,8-tetrahydro-1,3(2H,4H)-isoquinolinedione

Using 4-pyridinecarboxaldehyde, the reaction mixture was refluxed for one hour and was concentrated to one-third its volume. The resulting precipitate was collected and recrystallized from acetic acid to give 8.6 g. of product, M.P. 220–228° dec. (starts to darken at 160°).

*Analysis.*—Calcd. for $C_{15}H_{14}N_2O_2$ (percent): C, 70.85; H, 5.55; N, 11.02. Found (percent): C, 70.71; H, 5.59; N, 10.98.

EXAMPLE 13

4-furfurylidene-5,6,7,8-tetrahydro-1,3(2H,4H)-isoquinolinedione

Using furfuraldehyde, the reaction mixture was refluxed for 2.5 hours and allowed to stand at room temperature. It was filtered to give 10.5 g. of orange product, M.P. 235–240°. Recrystallization from acetic acid gave 9.5 g. of material, M.P. 240–242° (sinters at 218°).

*Analysis.*—Calcd. for $C_{14}H_{13}NO_3$ (percent): C, 69.12; H, 5.39; N, 5.76. Found (percent): C, 69.06; H, 5.41; N, 6.03.

EXAMPLE 14

4-benzylidene-5,6,7,8-tetrahydro-1,3(2H,4H)-isoquinolinedione by Method B

A mixture of 0.05 mole of 5,6,7,8-tetrahydrohomophthalamide, 0.05 mole of benzaldehyde, 1.0 g. of ammonium acetate, 200 ml. of toluene, and 100 ml. of pyridine was refluxed for 18 hours, employing a Dean-Starke tube to remove the water which was formed. Evaporation of the solvent gave a dark syrup which was dissolved in dichloromethane. The solution was washed successively with 0.1 N hydrochloric acid and water, dried, and evaporated. Recrystallization of the residue from methanol and then from benzene gave 7.5 g. of product, M.P. 160–180°; the thin layer chromatogram and infrared spectrum were identical to those of the product prepared by Method A.

EXAMPLE 15

4-benzylidene-5,6,7,8-tetrahydro-1,3-(2H,4H)-isoquinolinedione by Method C

A mixture of 1.65 g. (0.01 mole) of 5,6,7,8-tetrahydrohomophthalamide, 1.1 ml. (0.01 mole) of benzaldehyde, and 10 ml. of formic acid was heated on a steam bath for 1 hour, allowed to stand at room temperature an additional hour, and poured into excess water. The resulting semisolid was collected and partitioned between dichloromethane and water. The organic layer was successively washed with 1 N sodium hydroxide and water and was then evaporated to give 1.5 g. of product, M.P. 147–160°. Recrystallization from benzene gave 1.1 g. of material, M.P. 147–157°, identified by its thin layer chromatogram and infrared spectrum.

What we claim is:
1. A compound of the formula:

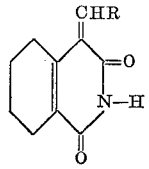

in which R is alkyl containing up to seven carbon atoms, phenyl, halogen substituted phenyl, carboxy substituted phenyl, hydroxy substituted phenyl, cyclohexyl substituted phenyl, alkyl substituted phenyl in which alkyl is as defined above, pyridyl and furyl.

2. A compound according to claim 1 which is 4-benzylidene-5,6,7,8-tetrahydro-1,3(2H,4H)-isoquinolinedione.

3. A compound according to claim 1 which is 4-(p-fluorobenzylidene) - 5,6,7,8 - tetrahydro-1,3(2H,4H)-isoquinolinedione.

4. A compound according to claim 1 which is 4-(2,4-dichlorobenzylidene)-5,6,7,8-tetrahydro-1,3(2H,4H)-isoquinolinedione.

5. A compound according to claim 1 which is 4-(p-carboxybenzylidene)-5,6,7,8-tetrahydro - 1,3(2H,4H)-isoquinolinedione.

6. A compound according to claim 1 which is 4-(o-carboxybenzylidene) - 5,6,7,8-tetrahydro-1,3(2H,4H)-isoquinolinedione.

7. A compound according to claim 1 which is 4-(p-hydroxybenzylidene)-5,6,7,8-tetrahydro - 1,3(2H,4H)-isoquinolinedione.

8. A compound according to claim 1 which is 4-(p-cyclohexylbenzylidene) - 5,6,7,8 - tetrahydro-1,3(2H,4H)-isoquinolinedione.

9. A compound according to claim 1 which is 4-(p-pentylbenzylidene) - 5,6,7,8 - tetrahydro-1,3(2H,4H)-isoquinolinedione.

10. A compound according to claim 1 which is 4-(p-chlorobenzylidene)-5,6,7,8-tetrahydro - 1,3(2H,4H) - isoquinolinedione.

11. A compound according to claim 1 which is 4-(2-methylpentylidene)-5,6,7,8 - tetrahydro - 1,3(2H,4H)-isoquinolinedione.

12. A compound according to claim 1 which is 4-(4-pyridylmethylene) - 5,6,7,8 - tetrahydro-1,3(2H,4H)-isoquinolinedione.

13. A compound according to claim 1 which is 4-furfurylidene-5,6,7,8-tetrahydro - 1,3(2H,4H) - isoquinolinedione.

References Cited

Dabard, Compt. rend. 244, 1651-3 (1957).

HENRY R. JILES, Primary Examiner

G. T. TODD, Assistant Examiner

U.S. Cl. X.R.

260—281; 424—258